April 7, 1942.  E. H. KOCHER  2,278,452
LUBRICATION
Filed Feb. 26, 1937  4 Sheets-Sheet 1
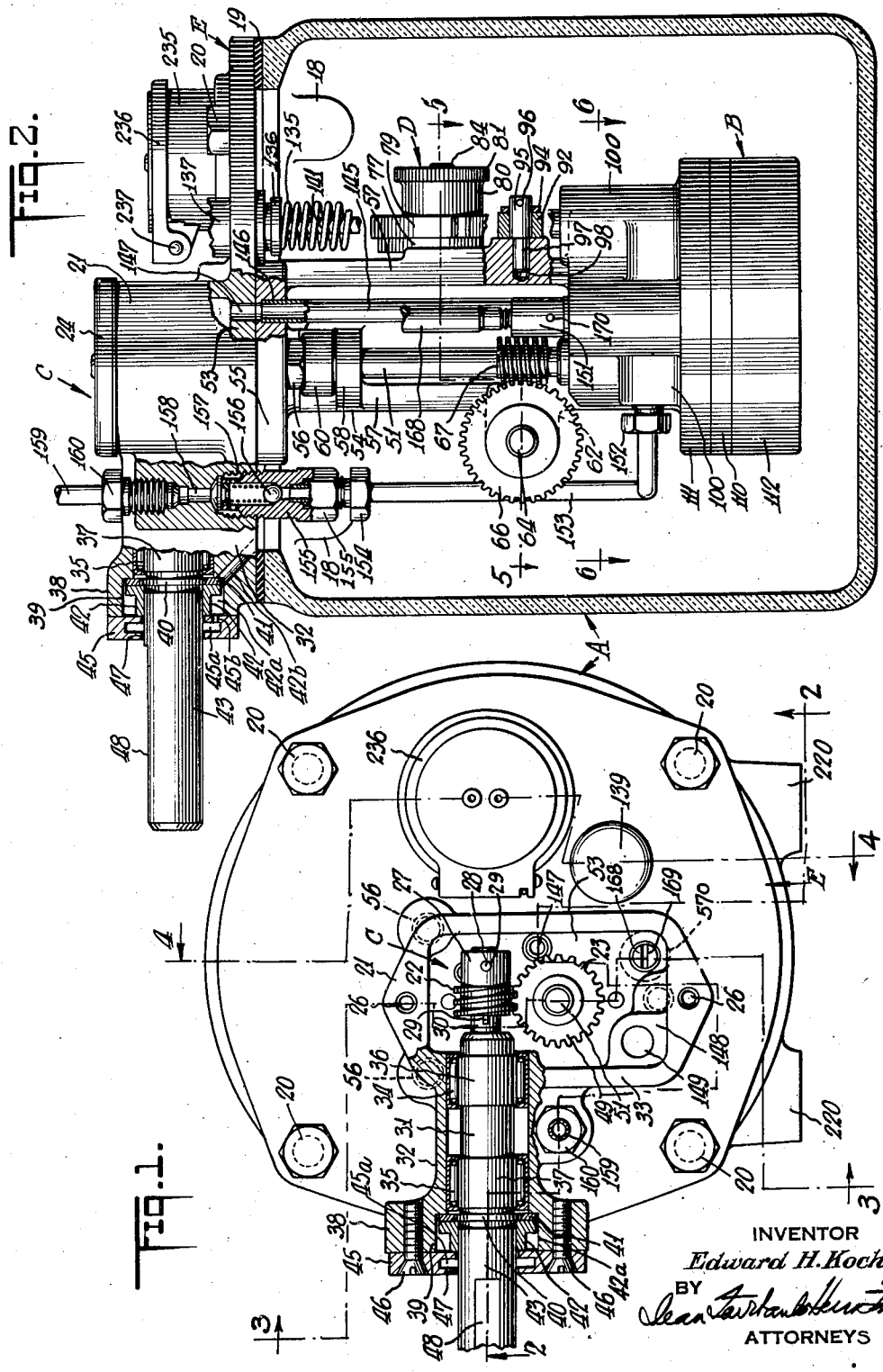
INVENTOR
Edward H. Kocher
BY
ATTORNEYS April 7, 1942.  E. H. KOCHER  2,278,452
LUBRICATION
Filed Feb. 26, 1937  4 Sheets-Sheet 2
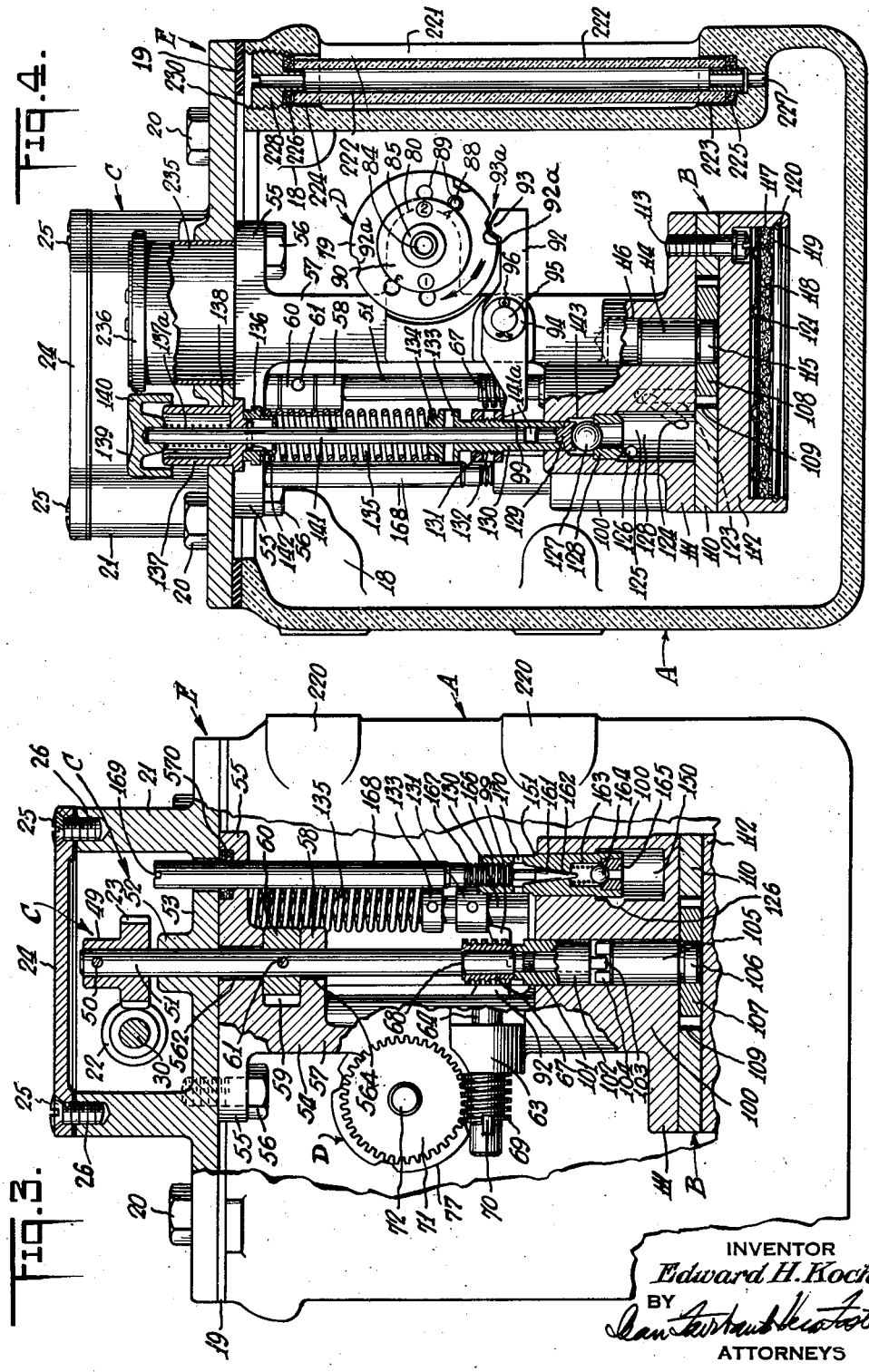
INVENTOR
Edward H. Kocher
BY
ATTORNEYS April 7, 1942.  E. H. KOCHER  2,278,452
LUBRICATION
Filed Feb. 26, 1937  4 Sheets-Sheet 3
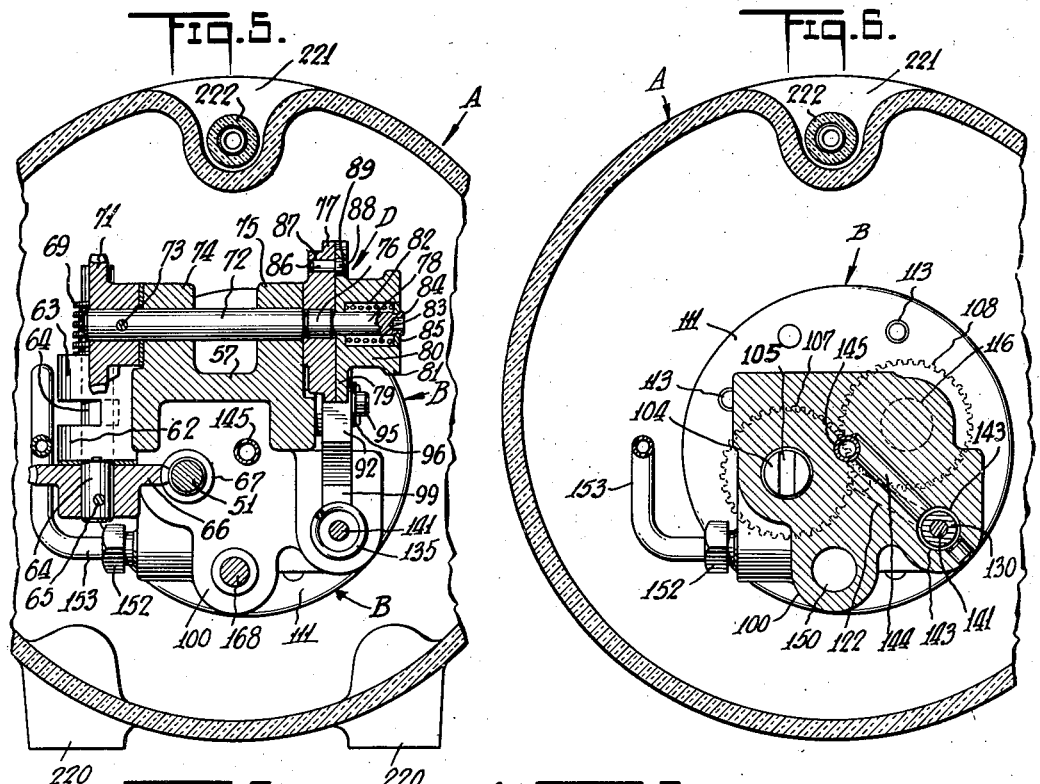
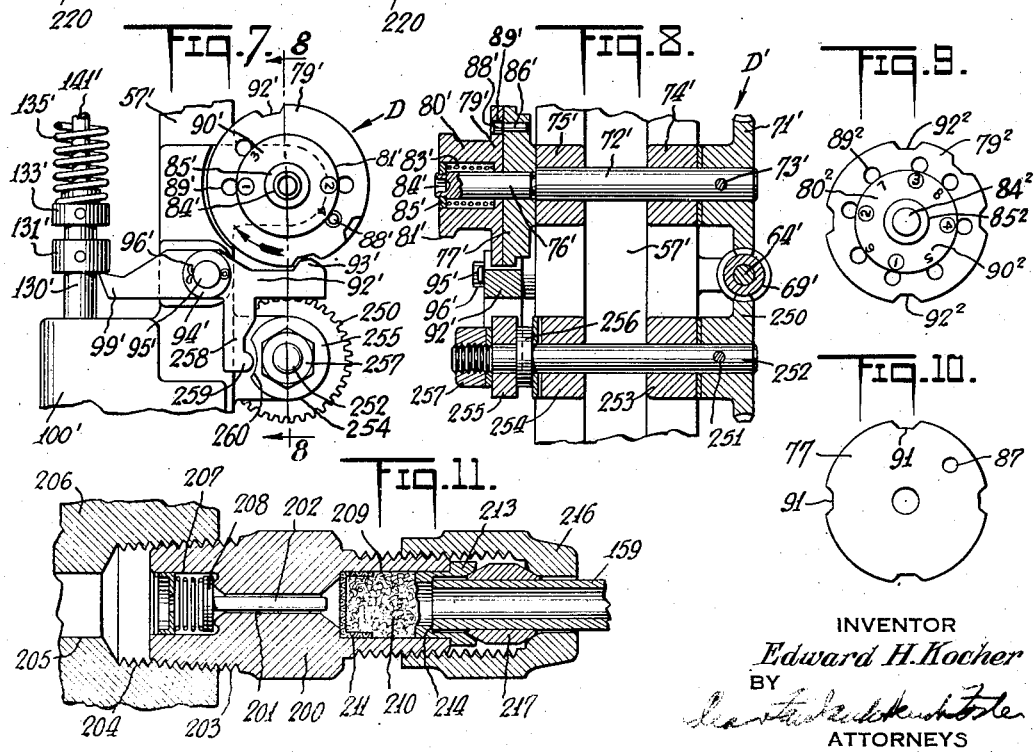
INVENTOR
Edward H. Kocher
BY
ATTORNEYS April 7, 1942.  E. H. KOCHER  2,278,452
LUBRICATION
Filed Feb. 26, 1937  4 Sheets-Sheet 4
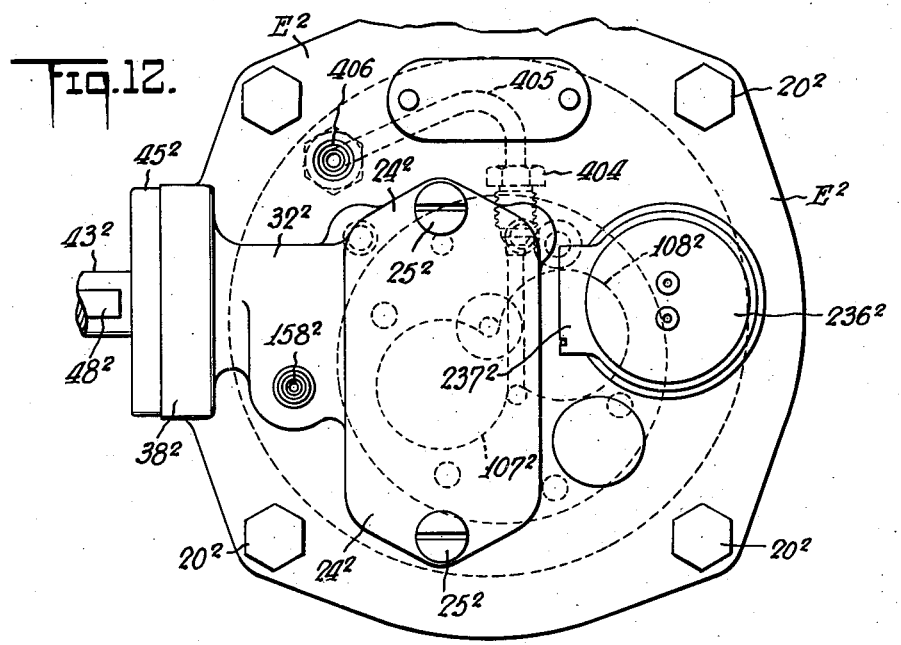
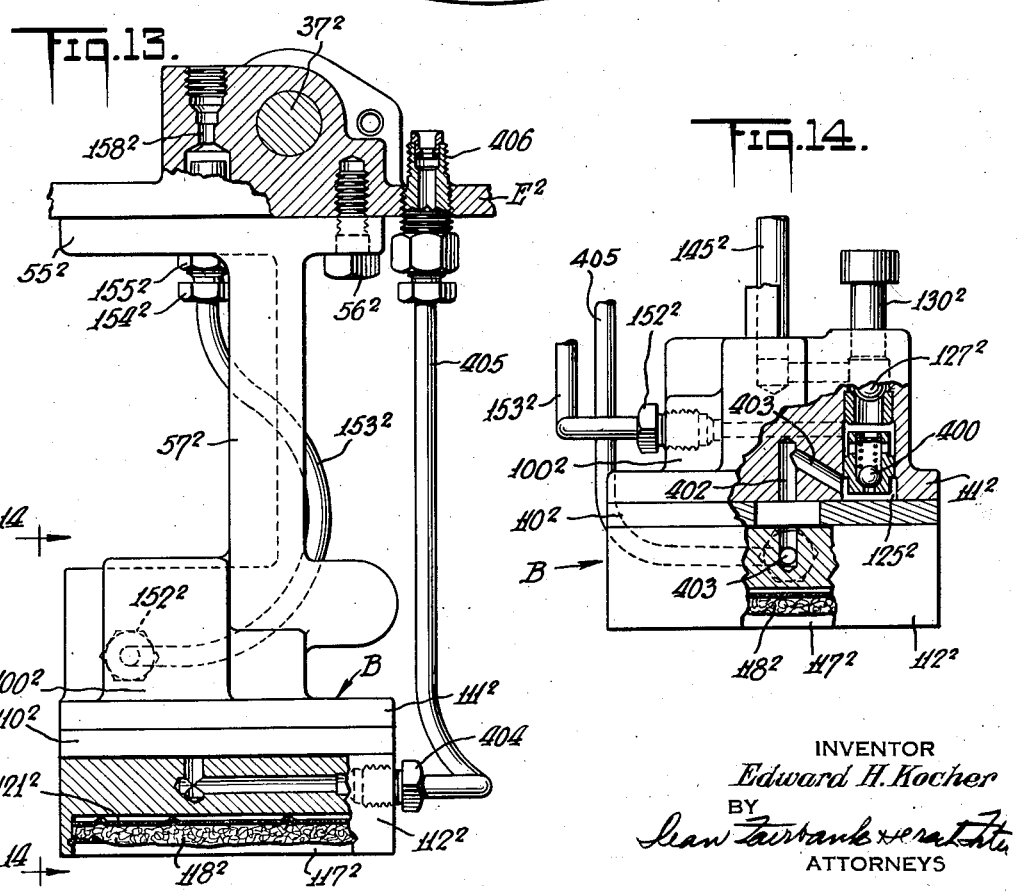
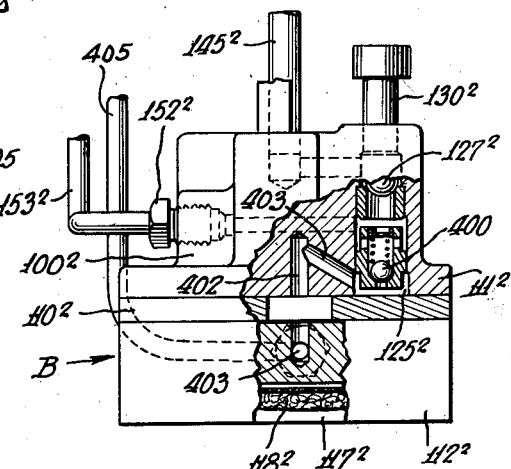
INVENTOR
Edward H. Kocher
BY
Sean Fairbanks + ra Fate
ATTORNEYS Patented Apr. 7, 1942

2,278,452

UNITED STATES PATENT OFFICE 2,278,452

LUBRICATION

Edward H. Kocher, Boonton, N. J., assignor to Auto Research Corporation, a corporation of Delaware Application February 26, 1937, Serial No. 127,857

11 Claims. (Cl. 184—7)

The present invention relates primarily to centralized lubrication and it particularly relates to the lubrication from a single source of a multiplicity of separate and distinct bearings in a mechanism or bearing arrangement.

The invention is more especially concerned with an automatic lubricating system, for example, of the type shown and described in the copending applications, Serial No. 566,705, filed October 3, 1931, now Patent No. 2,063,903, issued December 15, 1936, and Serial No. 635,526, filed September 30, 1932, now Patent No. 2,145,245, issued January 31, 1939, particularly when such systems are utilized in a high restriction metering system, for example of the type shown in Patents Nos. 1,632,771 and 1,632,772.

Although the invention of the present application will be particularly described in connection with its application to systems of the types shown and described in said copending applications and said patents, it is to be understood that it has a much broader application.

In said copending applications there is disclosed a centralized lubricating pump, which continuously feeds lubricant from a reservoir toward a lubricant piping system, said pump being preferably of the intermeshing gear type, but which pump may also be of other types adapted to discharge lubricant continuously from its outlet.

The pump is connected to branched distributing system leading to a plurality of bearings on a mechanism, such as a lamp machine, printing press, automatic machine tool, and so forth, having a smaller or larger number of bearings requiring relatively minute, yet accurately proportioned quantities of lubricant continuously or at desired intervals as the case may be.

The outlet branches of the lubricating system are preferably provided with high restriction metering outlets, affording a tremendously higher restriction or obstruction to the flow of lubricant than is encountered in the piping system or bearings so as to predominantly control the distribution of lubricant among said various bearings.

In the structure which is shown in said copending applications, the inlet of the distributing system, which is connected to the outlet of said continuously operating pump, is provided with a low restriction outlet back into the lubricant reservoir or back into the pump which has such a low obstructing effect as compared to the high restriction outlets that when said by-pass is open, all of the discharge of the pump will pass therethrough into the lubricant reservoir.

As shown in the preferred embodiment of said copending applications, said by-pass is provided with a cut-off valve periodically operated to cause application of a pressure impulse to said system.

It has been found for many commercial applications that it is necessary to have a wide range of adjustability so that said cut-off valve may be operated at widely spaced intervals or at relatively frequent intervals or first at one rate and then at another rate, during the cycle of operation of the machine which is being lubricated and it is among the primary objects of the present invention to provide an improved mechanism of the character described which will function to enable convenient adjustment of the periods and intervals when no lubricant is fed and the periods and intervals at and during which the lubricant will be forced by pressure into the lines of the distributing system.

It is also desirable for many purposes to provide a lubricant distributing installation which may be utilized to feed certain bearings intermittently and other bearings continuously and it is therefore among the further objects of the present invention to provide an improved lubricant supply system which may be utilized to feed lubricant both intermittently at determinable intervals and for determinable periods to certain bearings and continuously to other bearings having different lubricant requirements.

Other objects will be obvious or will appear during the course of the following specification.

According to one embodiment of the present invention the low resistance by-pass of the continuously discharging automatic pump mechanism is closed by a ball which is provided with a spring pressed follower normally lifted from the ball valve by a lever, so that said ball will be unseated by the discharge of lubricant from said pump, said lubricant then flowing into the by-pass back to a reservoir.

This lever at its end opposite to that which lifts the follower, is provided with a boss contacting with a double disk cam provided with a series of spaced recesses, which when they coincide and receive the boss release the spring of said follower and permit it to press said valve closed. This closure of the valve then results in a pressure impulse on the system.

In one preferred construction, according to the present application, two disks having a series of spaced recesses so positioned in respect to each other that these recesses may be caused to coincide in different manners or to be offset with respect to each other by turning one disk in respect to the other to predetermine position.

At each one of these different positions, a different series of recesses at different intervals will be presented to the boss of the lever with resultant variation in the interval between and the frequency of the pressure impulses upon the lubricating system.

In one preferred method of construction, the outermost disk is provided with a series of spaced holes one of which is received on an adjusting pin carried by the innermost disk.

When very infrequent feeds are sometimes desired, the lever may be provided with an additional arm, for example extending downwardly at right angles in respect to the first arm, which additional arm may be also provided with a boss. This boss may cooperate with a recessed third cam disk with the result that only when the recess on the double cam disk and on the third cam disk simultaneously receive the bosses on the arms of said lever will the valve be closed, and a shot be given to the system.

In order to provide a continuous feed which may be made available for supply to bearings requiring continuous lubrication, another outlet from the pump may be provided and the outlet to the intermittently closed valve may then be loaded to provide a pressure supply to said other outlet even though said valve be open.

In the drawings which illustrate several preferred constructions according to the present invention without at all limiting the invention since many different alternative and modified constructions are possible:

Fig. 1 is a top plan view of the lubricant pressure source pump and reservoir combination, partially broken away in order to show the driving mechanism.

Fig. 2 is a vertical section taken generally on the line 2—2 of Fig. 1, and is broken away at different points in order to more clearly show parts and mechanism hereinafter to be described.

Fig. 3 is a vertical section taken on the line 3—3 of Fig. 1 and shows the connection between the driving mechanism and reservoir control.

Fig. 4 is also a vertical section taken generally on the line 4—4 of Fig. 1 showing the push button and pump mechanism and a sectional view of the sight glass.

Figs. 5 and 6 are transverse sectional views upon the lines 5—5 and 6—6 of Fig. 2, respectively.

Figs. 7 and 8 are, respectively, an elevation and a side section of another form of vernier control.

Figs. 9 and 10, respectively, represent elevational views of the front and rear adjustable recessed disks of the present invention.

Fig. 11 is a longitudinal sectional view of one form of a flow proportioning device which may be employed.

Figs. 12 to 14 show a pump and reservoir combination similar to that of Figs. 1 to 6, but also provided with a continuous feed, Fig. 12 being a top view of the combination with the cover in position, Fig. 13 being a side view in fragmentary section of the cover and pump unit, and Fig. 14 being a side view in fragmentary section on the line 14—14 of Fig. 13 of the pump unit.

Referring to the drawings, the central supply unit, with which the present invention is particularly concerned, is shown as embodied in a glass or metallic reservoir A, which receives the pump B, the driving mechanism C and the control mechanism D to which last the present invention is particularly directed. The pump mechanism B and drive mechanism C are supported by the cover E which acts as a support and attachment member for the unit B—C.

It is to be understood that the cover E may be utilized for supporting the pump construction B and enable its insertion in any suitable pocket, or depression in the machine structure designed to receive lubricant other than the reservoir A.

The cover E, as best shown in Fig. 1, is provided with corners and the corners thereof are provided with the openings receiving the bolts 20 which extend through openings. These bolts 20 serve to clamp the cover E, its gasket 19 and its associated pump B, driving mechanism C, and control D to the reservoir A, see particularly Figs. 2 to 4.

Upon the flange-like cover E, is positioned the cup 21 containing the worm gear 22 and wheel gear 23. Said cup is provided with the cover 24 which is held down in position by the screws 25 threaded into the recesses 26, as best shown in Fig. 1.

The worm gear 22 is provided with a sleeve extension 27, which sleeve is fixed by the pin 28 in the slot 29 to the reduced end 30 of the shaft 31. The shaft 31 extends through a sleeve 32 which constitutes an extension of the side wall 33 of the cup 21, said sleeve receiving the roller bearing 34 and 35 which cooperate with the enlarged portions 36 and 37 of the shaft 31 (see Fig. 1).

The outer end of the sleeve 32 is flanged as indicated at 38, and has a socket 39 which receives the enlarged collar 40 cooperating with the press fitted ring 41 to press against the bottom of said socket and serve as a bearing. The sleeve 42 is press fitted on the outer portion 43 of said shaft 31. The outer portion of the recess 39 is closed by the plate 45, which is held in position by the screws 46, said plate being provided with the opening 47 through which extends the shaft extension 43. The recess 45a and the hole 45b in the plate prevent leakage of oil onto the exterior of the shaft 43. The hole 45b drains the oil back to the recess 42a from which it drains to the reservoir through the passage 42b.

The shaft extension 43 is flatted at 48 to enable convenient driving connection or positioning of a driving collar thereon.

The wheel gear 23 is provided with a collar 49 pinned at 50 to the shaft 51. The shaft 51 extends downwardly through the bored boss 52 extending upwardly from the floor 53 of the cup 21 (see Fig. 3.)

To the bottom of the cover E, is connected the structure 54 having the outstanding flange 55 bolted at 56 to the cover. The frame has the downwardly extending frame 57, which carries the horizontally extending arm 58, said arm 58 forming a recess 59 with respect to the flange structure 55. The recess 59 receives the collar 60 which is pinned at 61 to the shaft 51 forming a bearing and positioning the shaft 51 so that the worm 22 and wheel 23 will be held correctly in mesh.

It will be noted (see Fig. 3) that the shaft 51 extends downwardly through openings 562 and 563 in said flange structure 55 and said arm 58 respectively. The lower portion of the frame 57 (see Fig. 5) is provided with outstanding flanges 62 and 63 which receive the shaft 64. The shaft 64 at one side is pinned at 65 to the wheel gear 66, which wheel gear meshes with the worm 67 fixed to the shaft 51. The worm 67 abuts against the shoulder 68 of said shaft as best shown in Fig. 3. The shaft 64 at the other side of the flange or bracket 63 is connected to the worm 69 by the key 70 on the end of said shaft 64 (see Fig. 3).

The worm 69 meshes with and drives the gear wheel 71 fixed to the shaft 72 by the pin 73, see particularly Fig. 5. The shaft 72 extends through and bears in openings in the flanges 74 and 75. At its other end the shaft 72 is stepped as indicated at 76 to receive the recessed disk 77 and again at 78 to receive the recessed disk 79.

The disk 79 (see Fig. 5) is provided with a handle extension 80 which may be knurled at 81 to enable convenient gripping thereof. The disk 79 has a recess 82 which receives the coil spring 83, said coil spring reacting between the bottom of said recess 82 and the plate 85 carried by the shoulder and turned over portion 84 on the end of the stepped element 78 of the shaft 72.

The pin 86 is fixed or press fitted into the bore 87 in the disk 77 and its enlarged head 88 is adapted to be inserted adjustably in the openings 89 on the outside disk 79. The beveled end of the enlargement 88 will be readily observable in the particular opening 89 into which said head 88 is inserted as indicated in Fig. 4, with the result that it is possible for the operator to observe the exact adjustment of the disk 79.

The knob 80 may be grasped and drawn outwardly compressing the spring 83 and turned so that another opening 89 may be placed upon the enlarged head 88.

Each of said openings 89, as shown best in Figs. 4, 7 and 9, are designated by a numeral as indicated at 90 in Fig. 4.

It will be noted by reference to Fig. 10 that the recesses 91 on the back disk 77 and 92a on the front disk 79 may be so proportioned that a wide variation of adjustment may be obtained by changing the relative positions of the disks 77 and 79.

The follower lever 92 is provided with a boss 93 and is pivotally mounted on the stud 95, the split pin 96 and the washer 94 holding said lever 92 in position thereon (see Figs. 2 and 4). The boss 93 when received in cooperating recesses 91—92a has sufficient indicated clearance to assure the valve 127 will be closed by the follower 129 and the spring 135. By placing the recesses 91 and 92a so that they will coincide to the maximum extent, the boss 93 of the lever 92 will be permitted to move into the recesses at more frequent intervals than if the recesses are set so that some or all of them are out of register. The recesses 91 and 92a are so arranged and spaced that for each position indicated by the numerals in the circle at 90 in Fig. 9 there will be a different actuation of the lever 92 and the lever 92 will move upwardly on its right side to the position shown in Fig. 4 a different number of times for a complete rotation of the disks 77 and 79. The positioning and width of the recesses in the cams of Figs. 7 to 10 may be widely varied to the desired frequency and duration of lubricant to the bearings past the outlets of Fig. 11. The recesses are shown diagrammatically in Figs. 7 to 10, and not exactly of the shape, position and size as actually used.

As indicated in Fig. 2 the inner end of the shaft 95 is of reduced diameter at 97 and fits in a recess 98 in the frame structure 57. The other end of the lever 92 is provided with the claw 99 which cooperates with the valve to periodically permit seating thereof and permit a pressure discharge to the lubricating system.

Returning to the drive shaft 51, this shaft extends beyond the worm gear 67 into the pump body 100 which is carried at the lower end of the frame structure 57 and which forms a part of the lower end of the frame structure 57.

As shown in Fig. 3, the lower end of the shaft 51 is milled at 101 and is pressed into the sleeve 102, which is keyed at 103 to the elements 104 on the stud shaft 105. The stud shaft 105 at its lower end 106 is press fitted into the gear 107 which meshes the gear 108 (see Figs. 4 and 6). Both the gears fit in a dumb-bell shaped recess 109 in the plate 110. The plate 110 is clamped between the flange 111 at the bottom of the body 100 and the lower plate 112 by the bolts 113 (see Fig. 4). The gear 108, as best shown in Fig. 4, is also provided with a stud shaft 114 press fitted at its lower end 115 into the center portion of the gear 108.

The stud 114 bears in the recess 116 in the structure 100. The lower portion of the plate 112 is recessed at 117 to receive the filter 118 held in position by the inlet ring 119 and the snap ring 120.

The filter 118 is backed by the screens 121. The lubricant from the filter passes through the bore 122 (see Fig. 6) to the inlet side of the gear pump 107—108 and is discharged into the passageway 123 (see Fig. 4), which by the oblique bore 124 connects with the recess 125 in the pump structure 100. The lubricant passing into the chamber 125 through the bores 123 and 124 may then pass out through the bore 126 (see Fig. 4) or pass the ball check valve 127 which is provided with the annular seat 128.

The ball check is provided with a follower 129 having an enlarged head, the stud of which follower fits into a sleeve 130. This sleeve 130 is threaded at 132 to receive an adjustable nut 131, under which the claw 99 of the lever 92 fits. The upper end of the sleeve 130 is enlarged as indicated at 133 in Fig. 4, and is provided with a nipple 134 to receive the spring 135 which at its upper end reacts against the cup 136. The cup 136 is connected to the cup 137 extending through the bore 138 in the cover E.

Extending through the sleeve 130 is a rod 141 which as indicated at 141a is spaced from the follower 129 when the valve 127 is pressed down by the follower 129. The rod 141 at its upper end receives the press button 139 having the depending annular flange 140 which encloses the top of the cup 137. The pin 142 fits in the cup 136 and stops the push button 139 and rod 141 under action of the spring 137a as shown in Fig. 4.

Returning to the ball check 127, said ball check fits into a chamber 143 (see Figs. 4 and 6) above its seat which communicates with the bore 144 leading to the pipe 145. The pipe 145 extends upwardly to fit into the recess 146 (see Fig. 2) in the structure 55 at the top of the frame 57. The bore 147 opens into the floor 53 of the cup 21, whereby the bottom of the cup receives lubricant discharged by the pump 107—108, when the ball check 127 is lifted from the seat 128 by action of the claw 99 against the nut 132. This flow of lubricant into the cup 21 will assure lubrication of the bearings 35, 36, 52 and the gears 22 and 23, the excess lubricant filling up to the level of the shelf 148 and flowing back over the gearing 66—67 and 69—71 and to the reservoir through the opening 149 (see Fig. 1).

The feed to the distributing system takes place through the bore 126 from the chamber 125, as shown in Fig. 4. The bore 126 extends across the structure 100 to empty into the chamber 150 (see Fig. 3). The upper portion of the chamber 150 is closed by the press-fitted sleeve 151 and the side of chamber receives a compression coupling connection 152 to the outlet pipe 153 (see Fig. 2). The chamber 150 in Fig. 3 is shown in section somewhat offset from its actual position as shown in Fig. 6 and it does not communicate with the chamber receiving the gears 107 and 108.

The outlet pipe 153 is provided with a compression coupling connection 154 to the nut 155 which receives the spring seated ball check 156. The upper end of the nut has side and axial openings as shown to permit ready egress of oil into the passage 158. The nut 155 fits into the tapped socket 157 which communicates with the bore 158, which bore 158 in turn is connected to the external piping line 159 by the compression coupling connection 160.

To permit adjustment of the feed when the ball check 127 is closed, the needle valve 161 (see Fig. 3) is provided, fitting into the conical bore 162 in the member 151. The end of the member 151 is provided with a recess 163 which receives spring seated ball check 164 provided with the pressed-in valve seat 165.

The valve 161 has a threaded stem 167 extending into a tapped sleeve 166. The threaded stem 167 is continuously the rod 168, which rod projects through the flange 55 and up into the pocket 21, where it has a fillister slotted head 169. The gasket 570 fitting in a recess in the top of the flange 55 affords a lubricant tight connection.

The lower portion of the element 166 (see Fig. 3) is provided with the overflow openings 170 which permit the lubricant leaking past the needle valve 161 to flow back into the reservoir. The amount of leakage past the valve 161 is conveniently adjusted by removing the cover 24 of the cup 21 and turning the rod 168 by its head 169.

The order of restriction of the needle valve 161 is preferably of the same order as that of the flow restriction proportioning outlets connected to the distributing line 159. The obstructing effect of the needle valve and the outlets in all cases is preferably considerably higher than that of the line or bearings (say from 10 to 100 times).

In Fig. 11 is shown one typical form of a high restriction metering fitting of this type such as, for example, is more fully disclosed in Patents Nos. 1,632,771 and 1,632,772. The flow restriction metering fittings, as shown in Fig. 11, include a body 200 having a central accurately determined bore 201 with an accurately drawn pin 202 fitted therewithin.

The outlet end of the fitting 200 is pipe threaded at 203 to be received in the threaded socket 204 which communicates with the bore leading into the bearing structure 206.

The outlet end of the body 200 is provided with a recess 207 receiving the spring seated check valve 208.

The inlet end of the body 200 has a socket or recess 209 receiving the strainer 210 backed by the wire mesh cup 211 and held in position by the sleeve 213.

The tubing 159 abuts against the shoulder 214 in said sleeve 213. The nut 216 and double tapered coupling sleeve 217 hold the pipe 159 in position when the nut 216 is tightened as is shown and described more fully in Patent No. 2,029,325, and application Serial No. 727,719.

The valve 208 prevents siphoning from a higher level to a lower lever and also serves to prevent emission of lubricant to the bearings when the ball check 127 is opened.

The restriction 201—202 serves to afford a very high restricting effect or obstruction to feed from the pump 107—108 when the ball check 127 is closed. The conical valve 161 enables convenient adjustment of a parallel restriction to regulate and control the quantity of lubricant flowing through the restrictions 201—202 to the bearings when pressure impulses are given to the system.

Other restrictions or metering valves are shown in Patent Nos. 1,975,920, 2,017,848 and 2,003,281 may also be employed in combination with or in lieu of those shown in Fig. 11.

The gear pump 107—108 operates continuously and its operation in connection with the ball check 127 is more fully described in the copending applications, Serial No. 566,705, Patent No. 2,063,903 and Serial No. 635,526, now Patent No. 2,145,245, issued January 31, 1939. The button 139 normally permits the system to be flushed at will by closing valve 127, even though the boss 93 be riding upon the elevated portion of the double cam 77—79.

The lubricant, during the periods when the valve 127 is not pressed against the seat by the follower 129 and the spring 135, will feed the cup 21 through the pipe 145 assuring lubrication of the driving mechanism, the excess lubricant flowing back through the bore 149.

By grasping the handle element 80 and pulling out the disk 79, a setting of the cam disks 77—79 may be made to give a shot at the desired frequency, each different relative position of the cam disks 77—79 giving a different frequency.

For the type of disk with 4 settings, as shown in Fig. 4, the following settings may be made, approximate discharges for the times given being indicated:

| Cam setting No. | Discharge per shot | At normal interval between shots | Speed discharge | Hours for 1 pint discharge | Hours to empty reservoir |
|---|---|---|---|---|---|
|  | Cc. | Hrs. | Cc./hour |  |  |
| 1 | 8 | 3.75 | 2 | 240 | 500 |
| 2 | 14 | 3.75 | 3.5 | 135 | 300 |
| 3 | 14 | 1.87 | 7 | 65 | 135 |
| 4 | 32 | 1.87 | 17 | 28 | 60 |

With an 8-setting disk, as shown in Fig. 9, the following operation may be obtained.

| Cam setting No. | Discharge per shot | At normal interval between shots | Speed discharge | Hours for 1 pint discharge | Hours to empty reservoir |
|---|---|---|---|---|---|
|  | Cc. | Min. | Cc./hour |  |  |
| 1 | 8 | 25 | 20 | 24 | 50 |
| 2 | 11 | 25 | 25 | 19 | 40 |
| 3 | 14 | 25 | 35 | 14 | 30 |
| 4 | 21 | 25 | 50 | 9.5 | 20 |
| 5 | 10 | 6.25 | 90 | 5.5 | 11.5 |
| 6 | 14 | 6.25 | 140 | 3.5 | 7.5 |
| 7 | 21 | 6.25 | 200 | 2.5 | 5.5 |
| 8 | 32 | 6.25 | 300 | 1.5 | 3.25 |

The speed of rotation of the shaft 43 and capacity of reservoir may be widely varied to give above discharges. The above tables were based upon performance of a 2½ pint reservoir with varying sized parts to give these desired discharges at normal speeds of 67, 150 and 1800 R. P. M.

In all cases the rear disk as shown in Fig. 10 remains the same. In Fig. 9, parts functioning similarly to those shown and described in Figs. 4 and 5 are indicated by the same numerals provided with a superior 2.

Although the reservoir may take any shape and may be formed if desired in a cavity in the mechanism, the reservoir A as shown consists of a cast iron cup having the enlargements 220 (see Fig. 1) adapted to receive bolts from a suitable mount for the reservoir.

The side of the reservoir is recessed at 221 to receive the glass sight tubing 222, which is held in position in the recesses 223 and 224 and at its ends is provided with the gaskets 225 and 226.

The glass tubing 222 at its lower end communicates with the reservoir at 227. The nut 228 fitting in the tapped recess 230 in the top of the reservoir presses the tube 222 against the gaskets 225 and 226 to form lubricant tight connection.

The reservoir A may be filled through the neck 235 having the cover 236 pivotally connected to said neck at 237.

In the vernier control as shown in Figs. 7 and 8, similar functioning parts being indicated by the same numerals primed, the worm 69' is caused to drive an additional gear wheel 250 which is pinned at 251 on the shaft 252. The shaft 252 extends through and bears in the structure 253 and 254 and its outer end carries notched wheel 255 held in position against the disk 256 by the nut 257. The follower arm is provided a downwardly extending element 258 having the boss 259, which is designed to be received at intervals in the notch 260.

As long as a boss 259 is riding over the unnotched surface of the disk 255 it will not be possible for the boss 93' to be received in the cooperating recesses of the cam disks 77' and 79'. The arrangement shown in Figs. 7 and 8 thus provides a means by which even a slower feed of lubricant may be obtained than is above described.

It is to be understood that the control of Figs. 1 to 6 and the vernier control of Figs. 7 and 8 may be employed in other connections than to control the specific pump as shown in Figs. 1 to 6.

In Figs. 12 to 14 is shown an arrangement by which the pump of Figs. 1 to 6 may also be controlled to feed one or more bearings or groups of bearings continuously. In Figs. 12 to 14 similarly functioning parts to those shown in Figs. 1 to 6 are indicated by the same letters or numbers provided with a superior 2.

In the embodiment of Figs. 12 to 14 the outlet from the pump is loaded by the spring-pressed loading valve 400 before the valve check 127² (Fig. 14). To the outlet chamber 125² before said loading valve 400 are connected the outlet bores 402 and 403 in the pump body 100² which in turn are connected to tubing 405 by the compression coupling connection 404. The tubing 405 connects to the outlet connection 406 which in turn may be connected by tubing in one or more bearings or groups of bearings requiring continuous lubrication.

By the arrangement shown in Figs. 13 and 14 continuous feed may be obtained through the outlet 405 and intermittent feed through the outlet 153². The valve 400 loads the discharge through the outlet 405. The lubricant passing the valve 400 may discharge back to the reservoir, unless the valve check 127² is closed, whereupon it will discharge into the distributing lines. The pressure of the spring of valve 400 will determine the pressure of the discharge through outlet 405.

The invention, however, is not intended to be restricted to any particular construction or arrangement of parts, or to any particular application of any such construction, or to any specific method of operation, or manner of use, or to any of various details thereof, herein shown and described, as the same may be modified in various particulars or be applied in many varied relations without departing from the spirit and scope of the claimed invention, the practical embodiments herein illustrated and described merely showing some of the various features entering into the application of the invention.

What I claim is:

1. In a centralized lubricating installation of the type having a central source of lubricant supply and pressure, a branched distributing tubing system leading to a plurality of bearings to be lubricated at desirable intervals, said system being provided with means to meter the flow of lubricant through the system to the bearings to be lubricated; a connection between said source and said system provided with a return passage to the source, which return passage when open will receive all the discharge from said source and return it thereto, periodic cut-off valve means to periodically cut off said connection and adjustable means to regulate operation of said valve means, said adjustable means including two disks with recesses in the peripheries thereof at different spacings and of different sizes, a shaft carrying said disks, means to drive said shaft, means to press said disks closely together and means actuated by the cooperating recesses of said disks to actuate said periodic cut-off means.

2. In a centralized lubricating installation having a tubing system with a pump; means periodically to connect said pump to a return passage which will receive the discharge from the pump in preference to the system, said means being provided with an adjustment to vary the periods, frequencies and durations of such connections, said adjustment consisting of two disks, a carrying shaft for said disks, a coil spring concentrically positioned upon said shaft and pressing the two disks together, said disks being provided with differently spaced recesses and manual means to adjust the spacing and position of said recesses.

3. In a lubricating installation, a valve control comprising a valve, an actuator and a variable cam operating said actuator, said variable cam including two recessed disks, the periphery of which is differentially recessed, a shaft driving one of said disks, the other of said disks being fitted loosely upon said shaft, a coil spring fitting about said shaft and enclosed by said disks and pressing said disks together, a circular series of holes on one of said disks, a pin on the other disk to selectively be received in one of said holes and a knob on the disk which is loose on said shaft to permit the position of said disk to be changed.

4. In a lubricating installation, a valve control comprising a valve, a double arm lever actuator and a variable cam operating said actuator, said variable cam including two disks, each disk being provided with spaced peripheral recesses adapted to set in varied positions so as to be in and out of coincidence with each other and a second cam, said variable cam cooperating with one of the arms of said lever and the second cam cooperating with the other arm of said lever, said variable cam and said second cam being provided with means to rotate them at different speds.

5. In a lubricating installation, a valve control comprising a valve, an actuator therefor and a variable cam operating said actuator, said variable cam including two disks, a shaft carrying said disks, one of said disks being fixed upon the shaft and other being movable upon the shaft, each disk being provided with spaced peripheral recesses adapted to set in various positions so as to be in and out of coincidence with each other, one disk carrying a pin and the other disk carrying a plurality of openings to receive said pin, said other disk being provided with knob to permit it to be lifted from said first disk and thereby disengage said pin and the hole in which it is placed and permit said pin to be engaged in another hole, said knob being recessed adjacent said shaft to receive a coil spring to press said disks together.

6. In a lubricating installation, a central pump, a reservoir in which said pump is placed adjacent the bottom of the reservoir, said pump consisting of a pair of gears, and actuating shaft extending from the top of the reservoir to said pump and said gears, means to drive said shaft at the top of the reservoir, a valve control for controlling the outlet of said pump comprising a valve, an actuator lever therefor and a control for said actuator lever including a plurality of recessed cams, said lever being actuated only when the recesses in said cams coincide, means actuated by said shaft to drive said cams.

7. In a lubricating installation, a central pump, a reservoir in which said pump is placed adjacent the bottom of the reservoir, said pump consisting of a pair of gears, and actuating shaft extending from the top of the reservoir to said pump and said gears, means to drive said shaft at the top of the reservoir, a valve control for controlling the outlet of said pump comprising a valve, an actuator lever therefor and a control for said actuator lever including a plurality of recessed cams, said lever being actuated only when the recesses in said cams coincide, said cams being positioned on the same shaft and being adjustable in respect to each other, means actuated by said shaft to drive said cams.

8. In a lubricating installation, a central pump, a reservoir in which said pump is placed adjacent the bottom of the reservoir, said pump consisting of a pair of gears, and actuating shaft extending from the top of the reservoir to said pump and said gears, means to drive said shaft at the top of the reservoir, a valve control for controlling the outlet of said pump comprising a valve, an actuator lever therefor and a control for said actuator lever including a plurality of recessed cams, said lever being actuated only when the recesses in said cams coincide, said cams being positioned on different shafts and said lever provided with two cam cooperating arms, one extending to each cam, means actuated by said shaft to drive said cams.

9. In a centralized lubrication installation for a mechanism having a plurality of spaced bearings to be lubricated, of the type including a reservoir containing lubricant, a gear pump immersed in said lubricant at the bottom of said reservoir, a drive for said gear pump including a horizontal drive shaft at the top of said reservoir, gearing driven by said drive shaft and a vertical drive shaft driven by said gearing and extending downwardly to said gear pump and driving said gear pump, a branched distributing conduit system having a single inlet receiving lubricant from said pump and a plurality of outlets to said bearings, each such outlet being provided with a high obstruction metering device having a spring seated check valve and an obstructing effect tremendously higher than that of the conduit system, and bearings to be lubricated so as to predominantly control the proportionment of lubricant among said bearings, and two additional outlets from said system to said reservoir, one having an adjustable restriction of about the same obstructing effect as the metering devices, and the other being provided with a ball check to periodically cut off said other outlet to cause said pump to force lubricant into said system and said other outlet feeding lubricant to said gearing when not cut off, said ball check being provided with a seat, a spring-pressed follower to bias it toward its seat, a lever to lift said follower from said ball follower; a control device for actuating said lever including a plurality of recessed rotating disks actuating said lever to lift said follower except when the recesses in said disks are in coincidence.

10. In a centralized lubrication installation for a mechanism having a plurality of spaced bearings to be lubricated, of the type including a reservoir containing lubricant, a gear pump immersed in said lubricant at the bottom of said reservoir, a drive for said gear pump including a horizontal drive shaft at the top of said reservoir, gearing driven by said drive shaft drive and a vertical drive shaft extending downwardly to said gear pump and driving said gear pump, a branched distributing conduit system having a single inlet receiving lubricant from one outlet of said pump and said system having a plurality of outlets to said bearings, each such outlet being provided with a high restriction metering device having a spring seated check valve and an obstructing effect tremendously higher than that of the conduit system and the bearings so as to predominantly control the proportionment of lubricant among said bearings; an additional outlet system including three additional outlets from said pump, two being to said reservoir and respectively having an adjustable restriction of about the same obstructing effect as the metering devices, and being provided with a ball check to cause a periodic cut off and the other being to certain of said bearings requiring continuous lubrication.

11. In a pump, a tubing outlet connection provided with a by-pass arrangement to return lubricant to the reservoir, an automatically actuated valving device controlling said by-pass to periodically open and close said by-pass, said by-pass when opened permitting the pump discharge to return into the reservoir and when closed causing discharge under pressure to cause emission through said outlets into said bearings, said valve including a ball check, a valve seat, a follower rod, a head on said rod resting on said ball check, a sleeve on said rod, enlargements on said sleeve, coil spring means encircling said rod and pressing on one of said enlargements to press said sleeve against said head and said head against said ball check and said ball check against said seat, a lifter element cooperating with another of said enlargements to lift said sleeve from said head and thereby permit pump pressure to remove said ball check from said seat and the discharge from said pump to flow into said by-pass back to the reservoir and a cam to control said lifter element to lift said sleeve and to lower said sleeve, said cam having a plurality of disks having spaced recesses, which recesses may be selectively displaced in respect to one another, said lifter element having a follower portion to ride over said cam, to permit lowering of the sleeve at the recesses and to lift the sleeve at the unrecessed portions.

EDWARD H. KOCHER.